US009565679B2

(12) United States Patent
Lee et al.

(10) Patent No.: US 9,565,679 B2
(45) Date of Patent: Feb. 7, 2017

(54) METHOD FOR TRANSMITTING CONTROL SIGNAL FOR DEVICE-TO-DEVICE COMMUNICATION AND DEVICE THEREFOR

(71) Applicant: LG Electronics Inc., Seoul (KR)

(72) Inventors: Jihyun Lee, Anyang-si (KR); Suckchel Yang, Anyang-si (KR); Seungmin Lee, Anyang-si (KR); Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 14/412,121

(22) PCT Filed: Jul. 12, 2013

(86) PCT No.: PCT/KR2013/006276
§ 371 (c)(1),
(2) Date: Dec. 30, 2014

(87) PCT Pub. No.: WO2014/010995
PCT Pub. Date: Jan. 16, 2014

(65) Prior Publication Data
US 2015/0163790 A1    Jun. 11, 2015

Related U.S. Application Data

(60) Provisional application No. 61/671,079, filed on Jul. 12, 2012, provisional application No. 61/810,267, filed on Apr. 10, 2013.

(51) Int. Cl.
*H04J 3/06*          (2006.01)
*H04W 72/04*       (2009.01)
(Continued)

(52) U.S. Cl.
CPC .......... *H04W 72/048* (2013.01); *H04L 1/0025* (2013.01); *H04L 1/1812* (2013.01);
(Continued)

(58) Field of Classification Search
CPC ............. H04W 72/048; H04W 76/023; H04W 72/0406; H04L 5/0051; H04L 1/1812; H04L 1/1893; H04L 5/0055
(Continued)

(56) References Cited

U.S. PATENT DOCUMENTS

2008/0261537 A1    10/2008  Chen
2009/0073922 A1*   3/2009  Malladi ................. H04L 1/0004
                                              370/328
(Continued)

FOREIGN PATENT DOCUMENTS

KR    1020090030206    3/2009
KR    1020090128565    12/2009
KR    1020120074251    7/2012

*Primary Examiner* — Ricky Ngo
*Assistant Examiner* — Wei-Po Kao
(74) *Attorney, Agent, or Firm* — Dentons US LLP

(57) ABSTRACT

One embodiment of the present invention discloses a method for transmitting a control signal for device-to-device (D2D) communication with a second terminal by a first terminal in a wireless communication system, wherein the method is carried out by the first terminal and comprises the steps of: mapping control information for the D2D communication to a resource region for the D2D communication; and transmitting, to the second terminal, the mapped control information for the D2D communication with data for the D2D communication, wherein the control information for the D2D communication includes modulation and coding scheme (MCS) related information and hybrid automatic retransmission request (HARQ) related information, and the control information for the D2D communication can be
(Continued)

mapped to at least one symbol except for symbol(s) to which a reference signal is mapped.

12 Claims, 23 Drawing Sheets

(51) Int. Cl.
    *H04L 1/00*         (2006.01)
    *H04L 1/18*         (2006.01)
    *H04L 5/00*         (2006.01)
    *H04W 76/02*       (2009.01)

(52) U.S. Cl.
    CPC .......... *H04L 1/1893* (2013.01); *H04L 1/1896* (2013.01); *H04L 5/0053* (2013.01); *H04L 5/0055* (2013.01); *H04W 72/0406* (2013.01); *H04L 1/1822* (2013.01); *H04L 5/0051* (2013.01); *H04W 76/023* (2013.01)

(58) Field of Classification Search
    USPC .................................. 370/310–350, 503–520
    See application file for complete search history.

(56) References Cited

U.S. PATENT DOCUMENTS

| | | | |
|---|---|---|---|
| 2009/0098876 A1 | 4/2009 | Khan | |
| 2013/0178221 A1* | 7/2013 | Jung | H04L 9/0844 |
| | | | 455/450 |
| 2013/0322277 A1* | 12/2013 | Vanganuru | H04W 24/08 |
| | | | 370/252 |

\* cited by examiner

METHOD FOR TRANSMITTING CONTROL SIGNAL FOR DEVICE-TO-DEVICE COMMUNICATION AND DEVICE THEREFOR

This application is a 35 USC §371 National Stage entry of International Application No. PCT/KR2013/006276 filed on Jul. 12, 2013, and claims priority to U.S. Provisional Application Nos. 61/671,079 filed on Jul. 12, 2012 and 61/810,267 filed on Apr. 10, 2013, all of which are hereby incorporated by reference in their entireties as if fully set forth herein.

TECHNICAL FIELD

The present invention relates to a wireless communication system and, more particularly, to a method for transmitting a control signal in a Device to Device (D2D) communication system, and an apparatus therefor.

BACKGROUND ART

For cellular communication, a User Equipment (UE) located in a cell accesses an eNodeB (eNB), receives control information for data communication from the eNB, and then transmits and receives data to and from the eNB. That is, since a UE performs data communication via an eNB, to transmit data to another cellular UE, the UE transmits the data to the eNB and the eNB receives the data and transmits the received data to the other UE. Since a UE can transmit data to another UE only via an eNB as described above, the eNB schedules a channel and a resource for data communication and transmits channel and resource scheduling information to each UE. Although each UE needs to receive allocation of the channel and the resource for data communication from the eNB for the above-described type of communication between the UEs via the eNB, Device to Device (D2D) communication has a structure in which a UE directly transmits and receives a signal to and from a desired UE without going via an eNB or a relay.

When D2D communication for direct data communication between UEs is performed by sharing a resource with a legacy cellular network, each UE can perform D2D communication after a D2D resource is allocated.

Furthermore, a control signal for D2D communication needs to be transmitted and received between the UEs. Accordingly, each UE should transmit D2D control information to a peer UE, and the peer UE may receive D2D data based on received D2D control information.

DISCLOSURE

Technical Problem

An object of the present invention devised to solve the problem lies in a method for transmitting a control signal in a wireless communication system and, more particularly, in a method for transmitting and receiving a necessary control signal between UEs in a Device to Device (D2D) communication system.

Another object of the present invention devised to solve the problem lies in a method for allocating control information carried by a control signal to a D2D resource region in a D2D communication system.

It is to be understood that both the foregoing general description and the following detailed description of the present invention are exemplary and explanatory and are intended to provide further explanation of the invention as claimed.

Technical Solution

The object of the present invention can be achieved by providing a method for transmitting a control signal for Device to Device (D2D) communication between a first terminal and a second terminal in a wireless communication system, the method performed by the first terminal and including mapping D2D control information to a D2D resource region, and transmitting the mapped D2D control information together with D2D data to the second UE, wherein the D2D control information includes Modulation and Coding Scheme (MCS) related information and Hybrid Automatic Retransmission Request (HARQ) related information, and wherein the D2D control information is mapped to at least one symbol other than symbol(s) to which reference signal is mapped.

Preferably, the mapping may include mapping D2D control information having a higher priority to a symbol(s) closer to the symbol(s) to which reference signal is mapped.

Preferably, the D2D control information which is mapped to a symbol adjacent to the symbol(s) to which reference signal is mapped may be multiplexed through puncturing, and remaining D2D control information may be multiplexed through rate matching.

Preferably, a resource region to which D2D channel state information is mapped may be configured not to allow other D2D control information to be mapped thereto.

Preferably, the MCS related information and the HARQ related information may be respectively modulated and coded using a predetermined modulation and coding scheme.

Preferably, the HARQ related information may include at least one of a New Data Indicator (NDI) field indicating whether data is retransmitted, a HARQ process number or identifier field for identifying a HARQ process, and a HARQ Acknowledgement/Negative Acknowledgement (ACK/NACK) field.

Preferably, the method may further include multiplexing two fields of the MCS related information and/or the HARQ related information together and mapping the multiplexed two fields to the at least one symbol.

Preferably, a starting position and a mapping order of the D2D control information within the at least one symbol may be determined based on a type of the D2D control information.

Preferably, the mapping may include puncturing initial n and/or final m symbols if D2D transmission (Tx)-reception (Rx) switching is scheduled, where n and m are integers equal to or greater than 1, and excluding the punctured symbols from the D2D resource region.

In another aspect of the present invention, provided herein is a terminal configured to transmit a control signal for Device to Device (D2D) communication in a wireless communication system, the terminal including a Radio Frequency (RF) unit, and a processor configured to control the RF unit, wherein the processor is configured to map D2D control information to a D2D resource region, and to transmit the mapped D2D control information together with D2D data to a peer terminal, wherein the D2D control information includes Modulation and Coding Scheme (MCS) related information and Hybrid Automatic Retransmission Request (HARQ) related information, and wherein the D2D control information is mapped to at least one symbol other than symbol(s) to which reference signal is mapped.

Preferably, the processor may be configured to map D2D control information having a higher priority to a symbol(s) closer to the symbols to which reference signal is mapped.

Preferably, The D2D control information which is mapped to a symbol adjacent to the symbol(s) to which reference signal is mapped may be multiplexed through puncturing, and the remaining D2D control information may be multiplexed through rate matching.

Preferably, a resource region to which D2D channel state information is mapped may be configured not to allow other D2D control information to be mapped thereto.

Preferably, the MCS related information and the HARQ related information may be respectively modulated and coded using a predetermined modulation and coding scheme.

Preferably, the HARQ related information may include at least one of a New Data Indicator (NDI) field indicating whether data is retransmitted, a HARQ process number or identifier field for identifying a HARQ process, and a HARQ Acknowledgement/Negative Acknowledgement (ACK/NACK) field.

Preferably, the processor may be further configured to multiplex two fields of the MCS related information and/or the HARQ related information together and map the multiplexed two fields to the at least one symbol.

Preferably, a starting position and a mapping order of the D2D control information within the at least one symbol may be determined based on a type of the D2D control information.

Preferably, the processor may be further configured to puncture initial n and/or final m symbols if D2D transmission (Tx)-reception (Rx) switching is scheduled, where n and m are integers equal to or greater than 1, and to exclude the punctured symbols from the D2D resource region.

It is to be understood that both the foregoing general description and the following detailed description of the present invention are exemplary and explanatory and are intended to provide further explanation of the invention as claimed.

Advantageous Effects

According to an embodiment of the present invention, a control signal may be efficiently transmitted in a wireless communication system. Furthermore, according to an embodiment of the present invention, a control signal for D2D communication may be efficiently transmitted and received between UEs in a Device to Device (D2D) communication system.

In addition, according to an embodiment of the present invention, control information carried by a control signal may be efficiently allocated to a D2D resource region in a D2D communication system, and thus data reception or demodulation performance of D2D communication may be improved.

It will be appreciated by persons skilled in the art that the effects that could be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
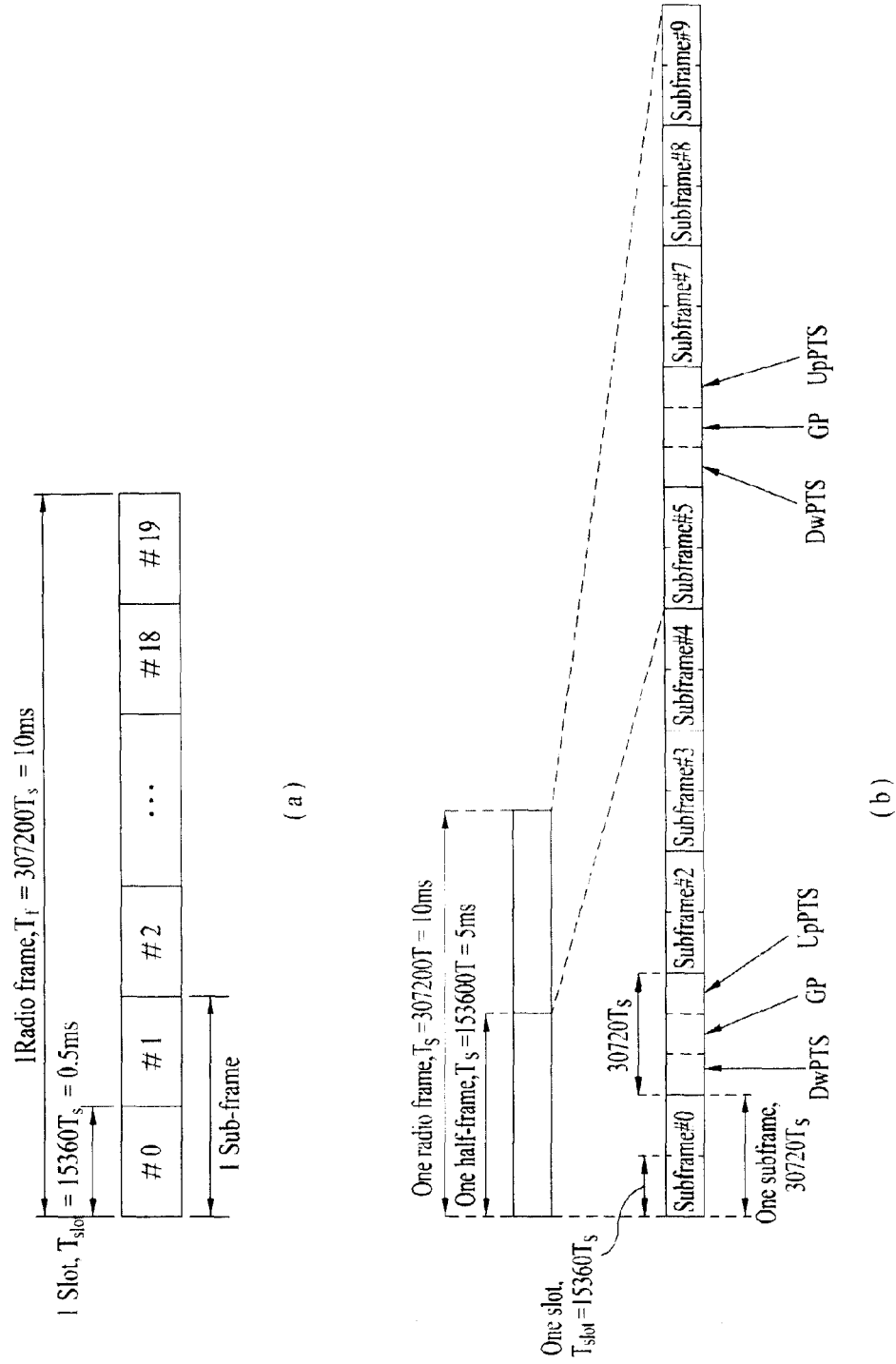
FIGS. 1(a) and 1(b) illustrate an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE 2-continued

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
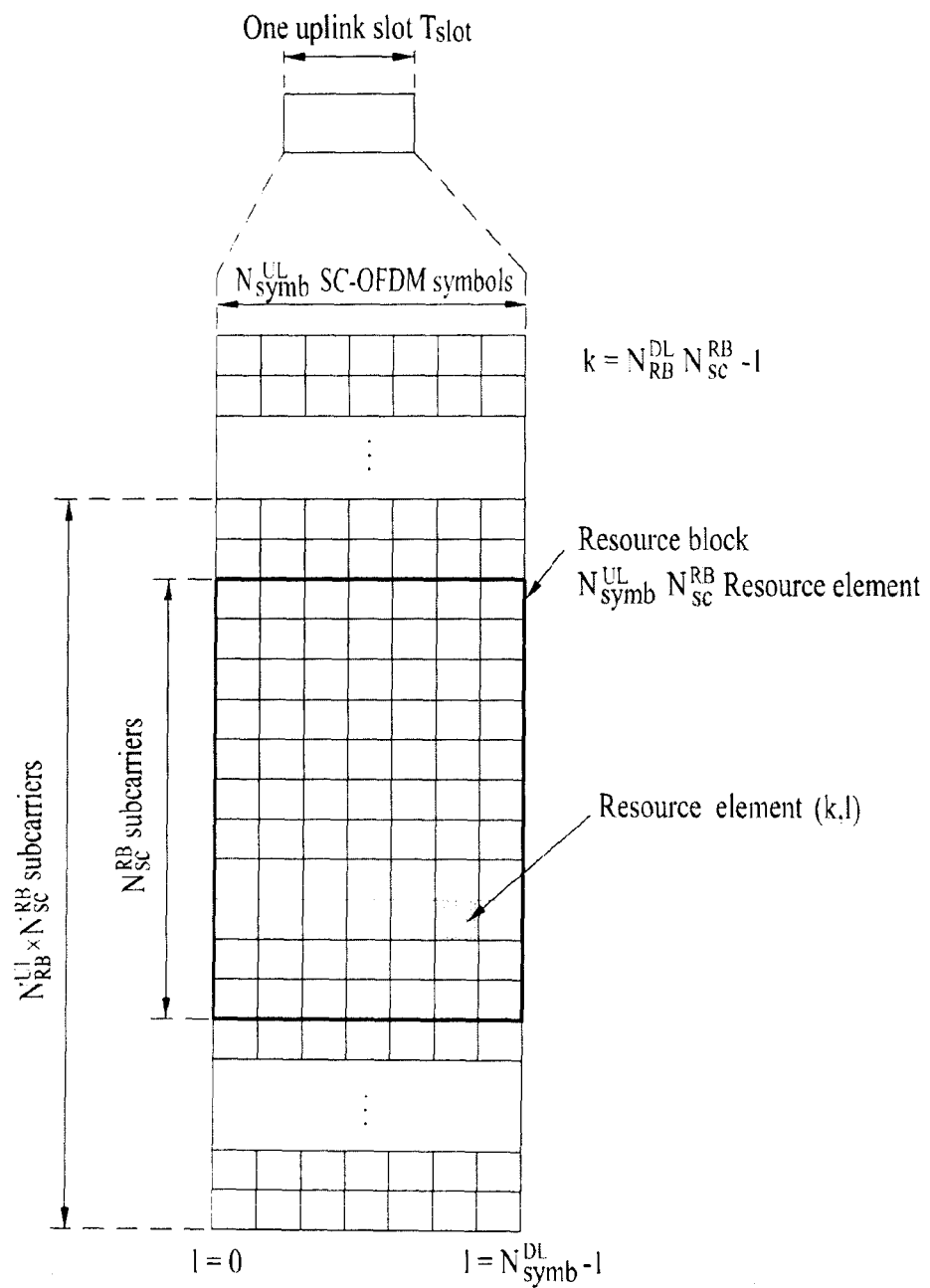
FIG. 2 illustrates an exemplary structure of a Downlink/Uplink (DL/UL) slot in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
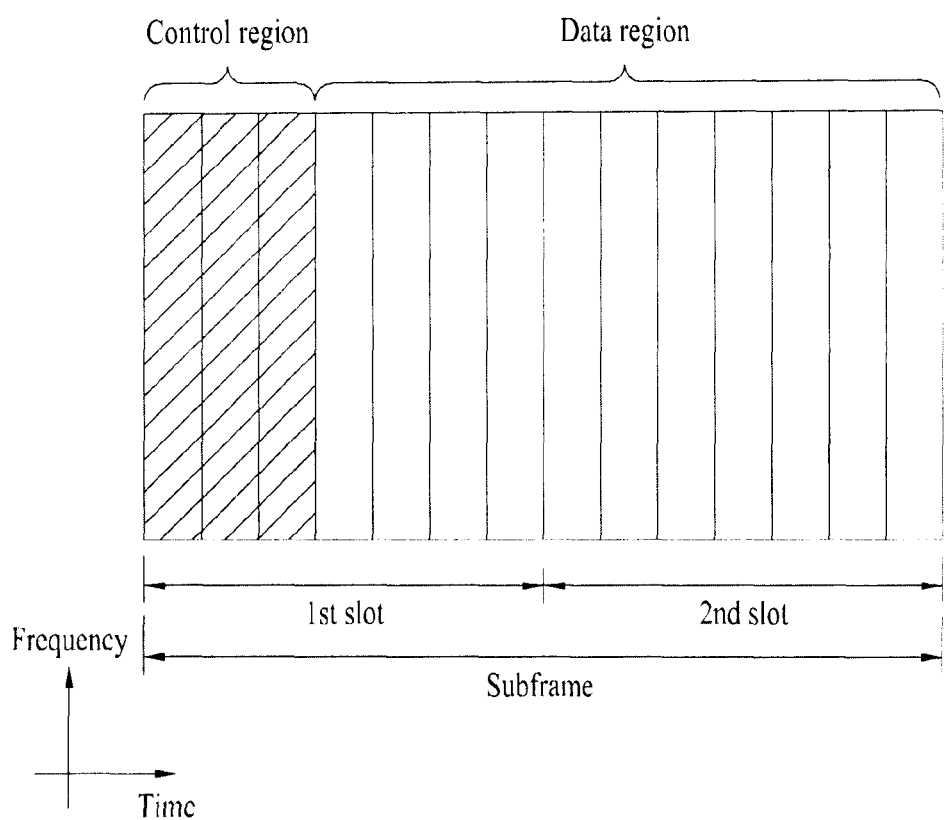
FIG. 3 illustrates an exemplary structure of a DL subframe in a 3rd Generation Partnership project (3GPP) Long Term Evolution (LTE)/LTE-Advanced (LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

Search Space

| Type | Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
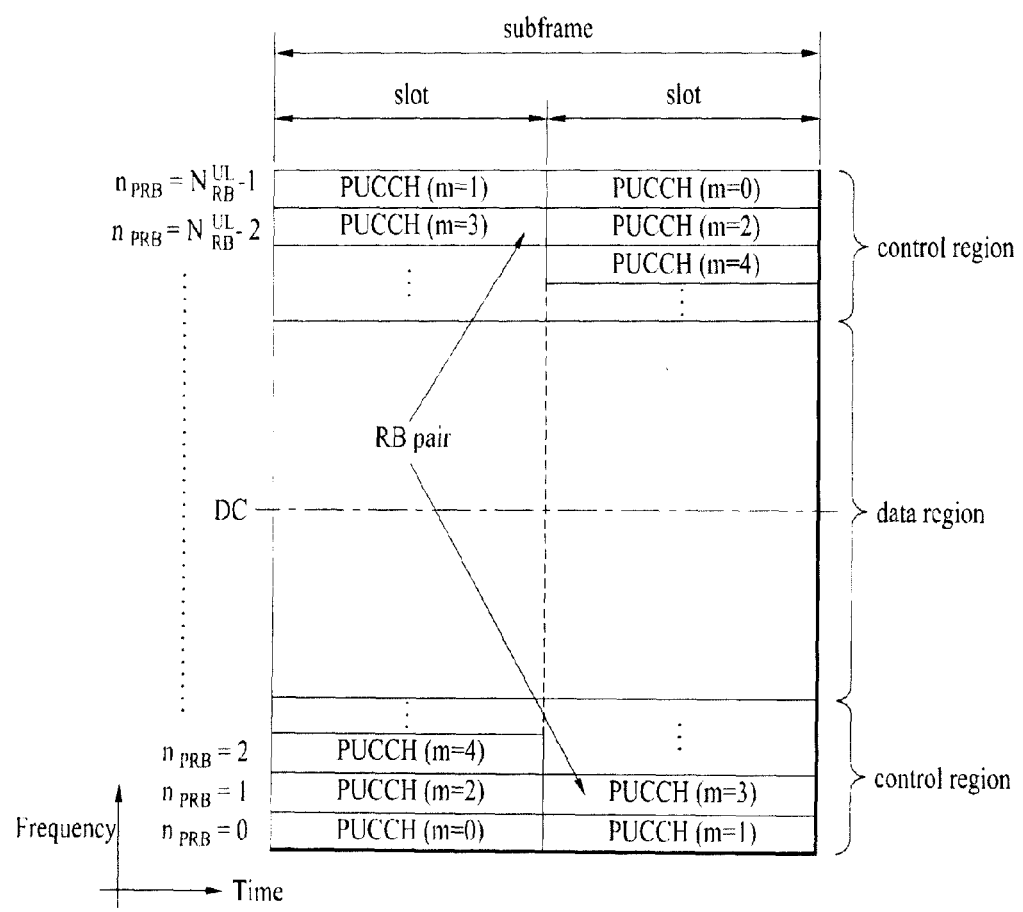
FIG. 4 illustrates an exemplary structure of a UL subframe in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + BPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

HARQ Process

In an LTE FDD system, eight Stop-And-Wait (SAW) HARQ processes are available in both uplink and downlink with a typical Round-Trip Time (RTT) of 8 ms.

Each HARQ process is defined by a unique 3-bit (4-bit in the case of LTE TDD) HARQ process identifier (or number), and requires a separate soft buffer allocated in a receiver (i.e., a UE in a downlink HARQ process or an eNodeB in an uplink HARQ process) for the purpose of combining retransmitted data. Furthermore, LTE defines that information including a New Data Indicator (NDI), a Redundancy Version (RV) and a Modulation and Coding Scheme (MCS) level is signaled to the receiver for HARQ operation.

A downlink HARQ process of the LTE system is asynchronous and adaptive and thus requires explicit signaling of control information for every downlink transmission. On the contrary, an uplink HARQ process is synchronous and either adaptive or non-adaptive. Non-adaptive uplink HARQ operation requires a pre-defined RV sequence 0, 2, 3, 1, 0, 2, 3, 1, . . . for successive transmissions of a packet due to the absence of explicit control signaling. However, for adaptive uplink HARQ operation, the RV is explicitly signaled.

Figure 5:
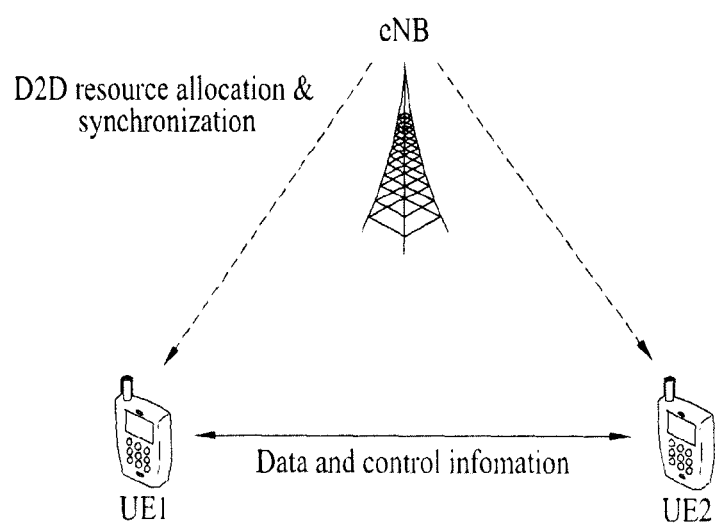
FIG. 5 illustrates an exemplary Device to Device (D2D) communication system.

FIG. 5 illustrates a network structure for Device to Device (D2D) communication according to an embodiment of the present invention. D2D communication refers to a wireless communication scheme in which a transmitter UE (UE 1) and a receiver UE (UE 2) directly communicate with each other without going via eNodeBs (eNBs).

Embodiment 1-D2D Control Signal

An embodiment of the present invention assumes that an eNB provides minimum control to D2D communication. For example, the eNB may configure (e.g., Semi Persistent Scheduling (SPS)) a specific time/frequency resource as that for D2D. This configuration may be signaled to each of a transmitter UE and a receiver UE in the form of PDCCH DL or UL Resource Allocation (RA). DL RA corresponds to RA for reception (Rx), and UL RA corresponds to RA for transmission (Tx). RA may be performed over a whole subframe. In this case, D2D RA may be regarded as being pre-defined and additional signaling may not be necessary.

A D2D UE may be allocated a resource defined for Tx/Rx from an eNB, and transmit or receive a D2D control signal to or from another D2D UE in the resource independently from the eNB. The D2D control signal may be divided into control information and feedback information for convenience. Representative control information may include a Modulation and Coding Scheme (MCS), a Hybrid Automatic Retransmission Request (HARQ) process number, a New Data Indicator (NDI), etc. of Tx data, and representative feedback information may include a CQI, an RI, a HARQ ACK/NACK, etc.

Although a new D2D control channel can be defined and designed to transmit the D2D control signal, more usefully, the D2D control signal may be piggybacked and transmitted on a pre-defined D2D data channel.

In this case, the D2D control signal is rate-matched or punctured to be transmitted together with D2D data. Information indicating whether and how to transmit the D2D control signal should be preliminarily shared between the D2D UEs and thus the receiver UE should be able to separate the D2D data and the D2D control signal from each other.

For example, when an uplink data channel (e.g., a PUSCH) of a legacy LTE(-A) system is reused as the D2D data channel, the D2D control signal may be transmitted on the D2D data channel similarly to a method for multiplexing UCI to the PUSCH. That is, when the existing PUSCH is used to transmit the D2D data, a method for piggybacking the UCI on the PUSCH is utilized to piggyback the D2D control signal on the D2D data.

The UCI to be piggybacked on the PUSCH includes a CSI and a HARQ ACK/NACK. Accordingly, the PUSCH data may be replaced with the D2D data, and the CSI and the HARQ ACK/NACK may be replaced with an MCS, a HARQ process number and an NDI corresponding to the control information of the D2D control signal. The HARQ ACK/NACK may be 1 bit or 2 bits, and the control information replacing the HARQ ACK/NACK may be the NDI in the case of 1 bit, or the NDI for 1 bit and the HARQ process number (or ID) for another 1 bit in the case of 2 bits. In this case, the feedback information for D2D communication, i.e., the CSI and the HARQ ACK/NACK, may be transmitted on a PUCCH.

In detail, assuming that an RA, a TPC, an RV, etc. are predetermined, examples of information included in a D2D control signal required for D2D communication are as described below.

D2D UE1->D2D UE2: MCS of data transmitted from UE1 to UE2, and MCS, HARQ ACK/NACK (hereinafter also referred to as AN), NDI of data transmitted from UE2 to UE1

UE2->UE1: CQI (and/or PMI, RI), HARQ ACK/NACK, NDI

Although UE1 can determine an MCS of D2D data transmitted from UE2, more conveniently, each UE may transmit D2D data thereof together with an MCS of the D2D data. Accordingly, MCS, HARQ ACK/NACK, NDI and CQI information is required as a D2D control signal to be piggybacked on a PUSCH, and CQI (and/or PMI, RI) information may be omitted for a specific UE if channel feedback is not transmitted in two directions. Furthermore, if necessary, a HARQ process ID may also be included in the D2D control signal to be piggybacked on the PUSCH.

Embodiment 2

A description is now given of how the above-described D2D control information to be piggybacked on a D2D data channel is multiplexed with the D2D data channel.

Figure 6:
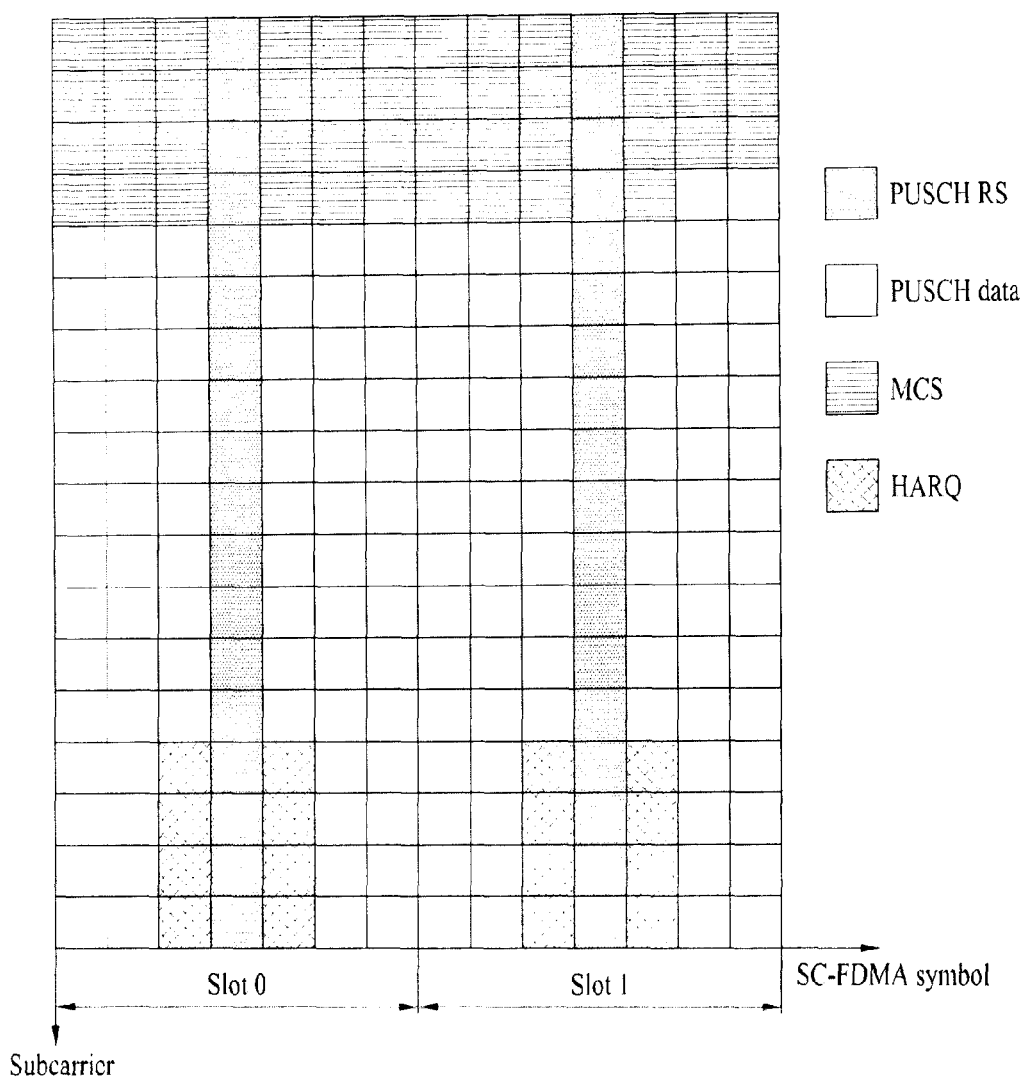
FIG. 6 illustrates an exemplary subframe structure for D2D communication according to an embodiment(s) of the present invention.

FIG. 6 illustrates a D2D data channel according to an embodiment of the present invention. That is, FIG. 6 illustrates how a D2D control signal is multiplexed with D2D data on REs of the D2D data channel using a PUSCH. In FIG. 6, "MCS" denotes an MCS field indicating a modulation order of the D2D data channel in a corresponding SF, and "HARQ" denotes an NDI indicating whether data of the corresponding SF is retransmitted and/or a HARQ process ID associated with the data of the corresponding SF, which are hereinafter referred to as an MCS field and a HARQ field, respectively.

The number of REs assigned to the MCS field and the HARQ field may vary depending on an MCS of a corresponding signal. This number may use a value predetermined between D2D UEs or may be semi-statically configured by an eNB for the UEs through higher layer signaling (e.g., RRC signaling). In this case, the configuration associated with the MCS may be separately applied to the MCS field and the HARQ field.

The MCS field is located at a starting position of a resource for transmitting D2D data and may be sequentially mapped to all SC-FDMA symbols of a starting subcarrier and then continuously mapped to a subsequent subcarrier. The D2D data is rate-matched in consideration of the MCS field and thus no overlapping is caused. The HARQ field is mapped to symbols adjacent to an RS and punctured into SC-FDMA symbols of the D2D data. Preferably, the maximum number of symbols for the HARQ field is 4.

Similarly to UCI transmission on a PUSCH without data using QPSK modulation, a D2D control signal may also be transmitted without D2D data. In this case, control signals are multiplexed and scrambled before Discrete Fourier Transform (DFT) spreading.

The location of the D2D control signal within the D2D data channel (specifically, a starting position and a mapping order) may be pre-defined and a modulation scheme of the D2D control signal may use a value pre-defined or pre-designated between the D2D UEs, thereby allowing demultiplexing in the receiver D2D UE. For example, when the MCS field and the HARQ field are transmitted together with the data, the locations of the MCS field and the HARQ field may be defined as illustrated in FIG. 6, QPSK (or BPSK) may be used as a modulation scheme, and repetition coding may be applied to the HARQ field while tail-biting convolutional coding may be applied to the MCS field.

The number of REs occupied by the D2D control signal may vary. Information thereon may be pre-defined, configured through RRC signaling, or acquired through blind decoding in a selective manner.

Here, the number of REs can be regarded as being pre-defined when the number of REs allocated to transmit the D2D control signal is statically predetermined. The configuration of the number of REs through RRC signaling means that the number of REs allocated to transmit the D2D control signal is semi-statically variable and that an eNB can designate an aggregation level of the D2D control signal. At this time, the aggregation level is obtained by identifying and indexing the number of REs which is variable depending on a coding rate. The number of REs acquired through blind decoding means that the number of REs is found by searching all available aggregation levels from a starting position of the D2D control signal within the D2D data channel until the D2D control signal is successfully decoded. In this case, a candidate aggregation level set may be given to reduce the number of search trials.

Figure 7:
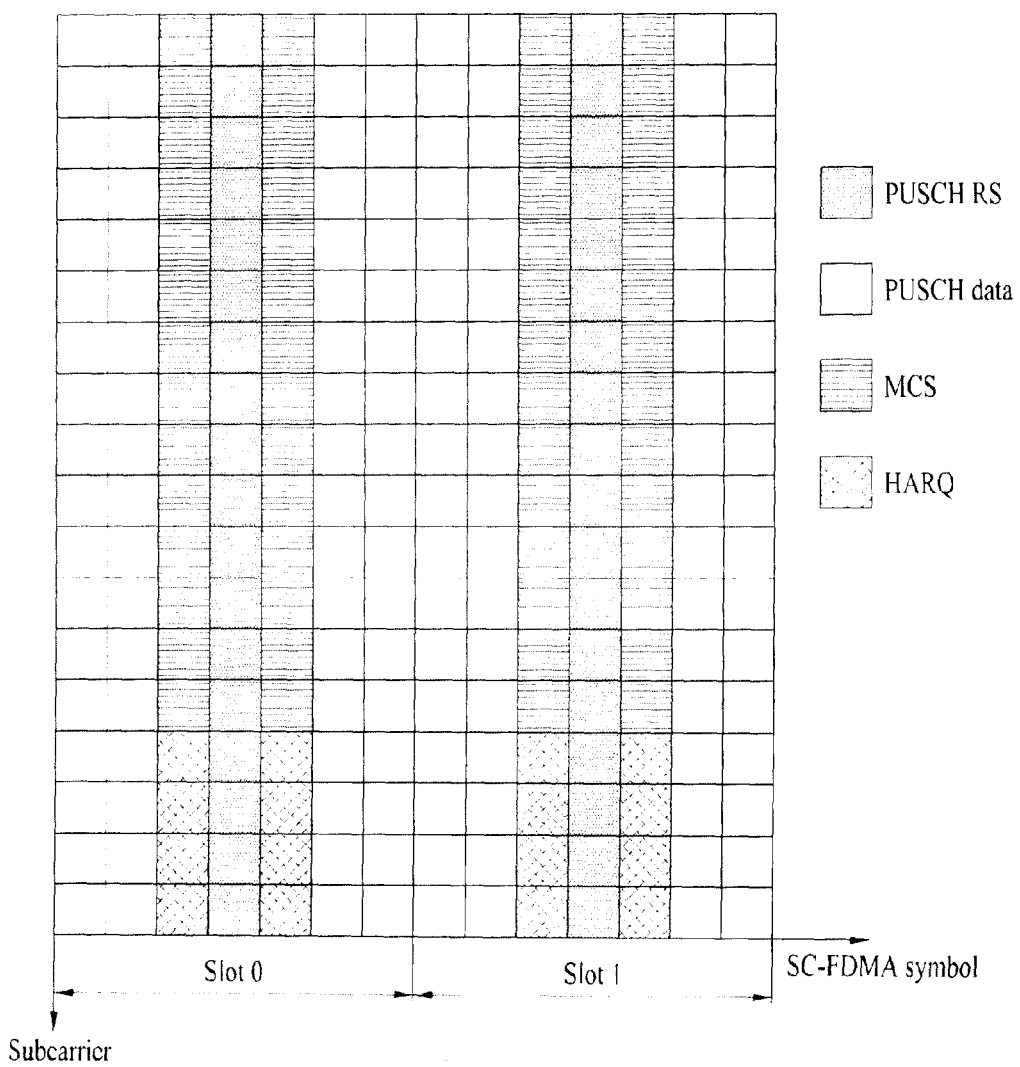
FIG. 7 illustrates an exemplary subframe structure for D2D communication according to another embodiment(s) of the present invention.

The location of the D2D control information within the D2D data channel does not always need to be configured as illustrated in FIG. 6, and can be variously changed or modified. For example, the MCS field may be mapped to SC-FDMA symbols adjacent to RS symbols as illustrated in FIG. 7 to achieve a gain through optimal channel estimation.

Embodiment 3

According to an embodiment of the present invention, D2D control/feedback information may be mapped to a D2D data channel closely to RS (e.g., DMRS) symbols depending on priorities thereof. For example, optimal channel estimation may be achieved by mapping a HARQ field to symbols 2, 4, 9 and 11 in FIG. 6.

If NDI>AN is assumed in terms of priority, the NDI may be mapped to symbols 2, 4, 9 and 11 and the AN may be mapped to symbols 1, 5, 8 and 12 adjacent to the NDI. The NDI and the AN mapped as described above are illustrated in FIG. 8.

That is, D2D control/feedback information having a higher priority may be mapped to symbols closer to a DMRS.

Figure 9:
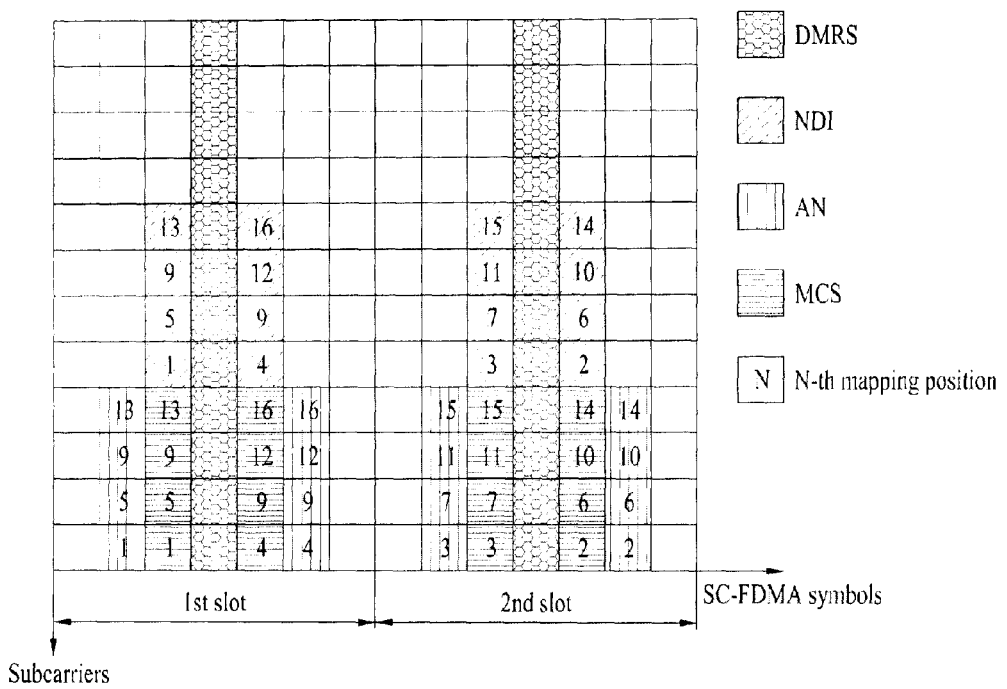
FIG. 9 illustrates an exemplary subframe structure for D2D communication according to another embodiment(s) of the present invention.

Similarly, symbols for transmitting each type of D2D control information may be defined differently for an MCS, an AN and an NDI based on priorities thereof. For example, if MCS>=NDI>AN is satisfied in terms of priority, mapping may be performed as illustrated in FIG. 9. In FIG. 9, the number of necessary coded symbols is assumed to be 16 equally for the AN, the NDI and the MCS. Since a major problem such as HARQ buffer corruption occurs when the MCS and the NDI are inappropriately decoded while a minor problem such as HARQ delay occurs when the HARQ-ACK has an error, the MCS and the NDI have higher priorities and thus are transmitted using the closest symbols to DMRS symbols.

Figure 10:
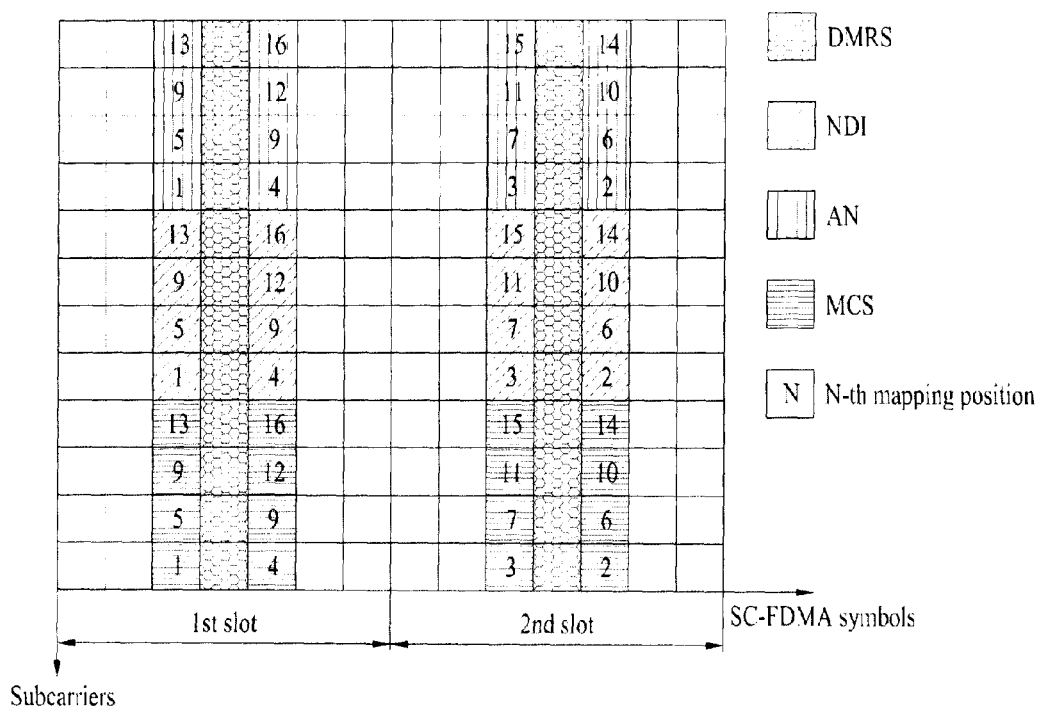
FIG. 10 illustrates an exemplary subframe structure for D2D communication according to another embodiment(s) of the present invention.

Alternatively, all of the MCS, the AN and the NDI may be mapped to symbols adjacent to an RS as illustrated in FIG. 10. Using this method, optimal channel estimation may be performed on all of the MCS, the AN and the NDI.

Embodiment 4

Figure 11:
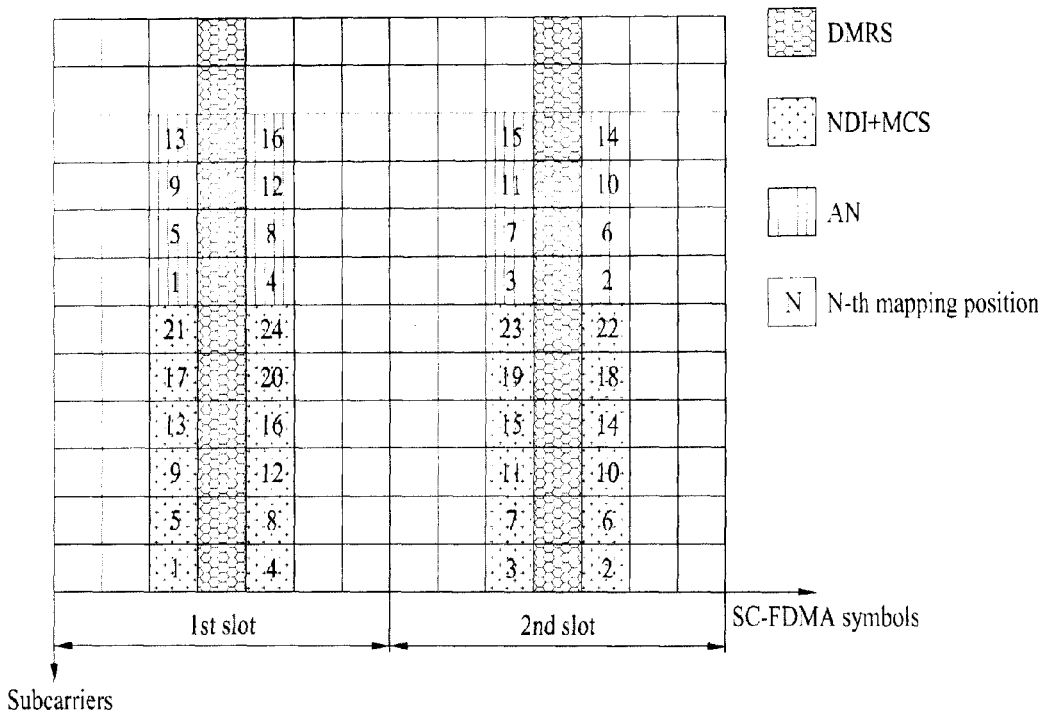
FIG. 11 illustrates an exemplary subframe structure for D2D communication according to another embodiment(s) of the present invention.

According to another embodiment of the present invention, two or more types of D2D control information may be transmitted in combination. Particularly, an NDI which is 1-bit information may be combined with other D2D control information, i.e., one of an MCS, an AN and a CQI. FIG. 11 illustrates an example in which D2D control information is defined by combining the MCS and the NDI separately from the AN which is D2D feedback information, and then all mapped to 4 symbols adjacent to RS symbols.

Meanwhile, the locations and mapping orders of different types of D2D control information should be determined. For example, different types of D2D control information may be determined to be mapped from two ends of different subcarriers or from two ends of an allocated RB. When the D2D control information is divided into MCS+NDI information and AN information and is transmitted using 4 symbols adjacent to an RS, the MCS+NDI information may start to be mapped from the lowest symbol number of the lowest subcarrier number, and the AN information may start to be mapped from the lowest symbol number of the highest subcarrier number, or vice versa. Furthermore, the NDI may be transmitted in combination with other control information such as the AN.

Embodiment 5

D2D data may be transmitted together with D2D feedback information such as a CSI in addition to D2D control information. Like the D2D control information, the D2D feedback information can be transmitted at a determined location using a determined modulation scheme. However, usefully, the D2D feedback information may be mapped continuously to an ending position of a transmission period of the D2D control information using an MCS of a PUSCH. The MCS of the D2D feedback information may be indicated through separate RRC signaling. Furthermore, the D2D control information may be transmitted continuously to the D2D feedback information.

Figure 12:
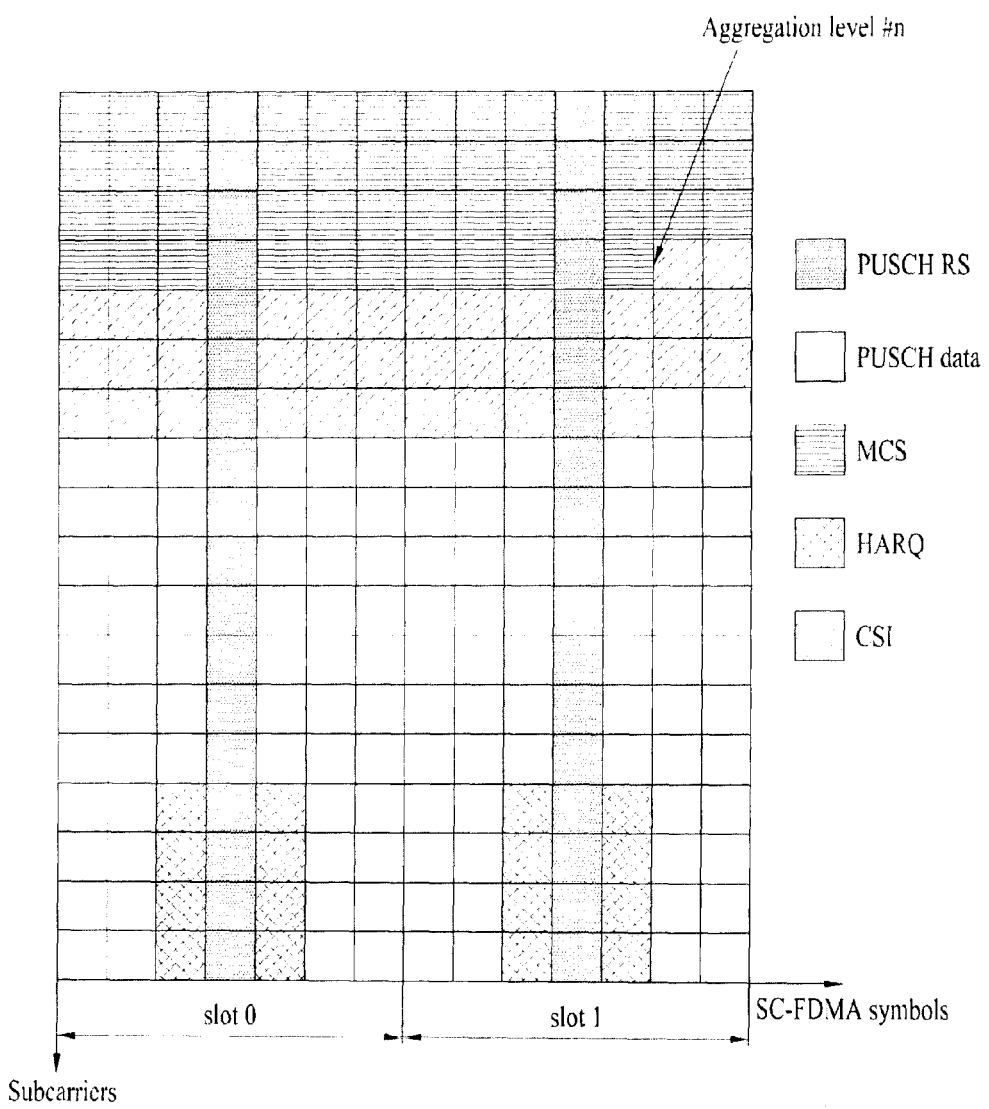
FIG. 12 illustrates an exemplary subframe structure for D2D communication according to another embodiment(s) of the present invention.

FIG. 12 illustrates an example in which an MCS field corresponding to D2D control information and a CSI field corresponding to D2D feedback information are continuously transmitted. Both types of information may be multiplexed with D2D data. In this case, an aggregation level of the MCS field may be acquired through RRC signaling, blind decoding, or the like, and the number of REs corresponding to the aggregation level will be used to transmit the MCS field. Accordingly, a starting offset of the CSI field will correspond to the aggregation level of the MCS field.

Embodiment 6

Figure 13:
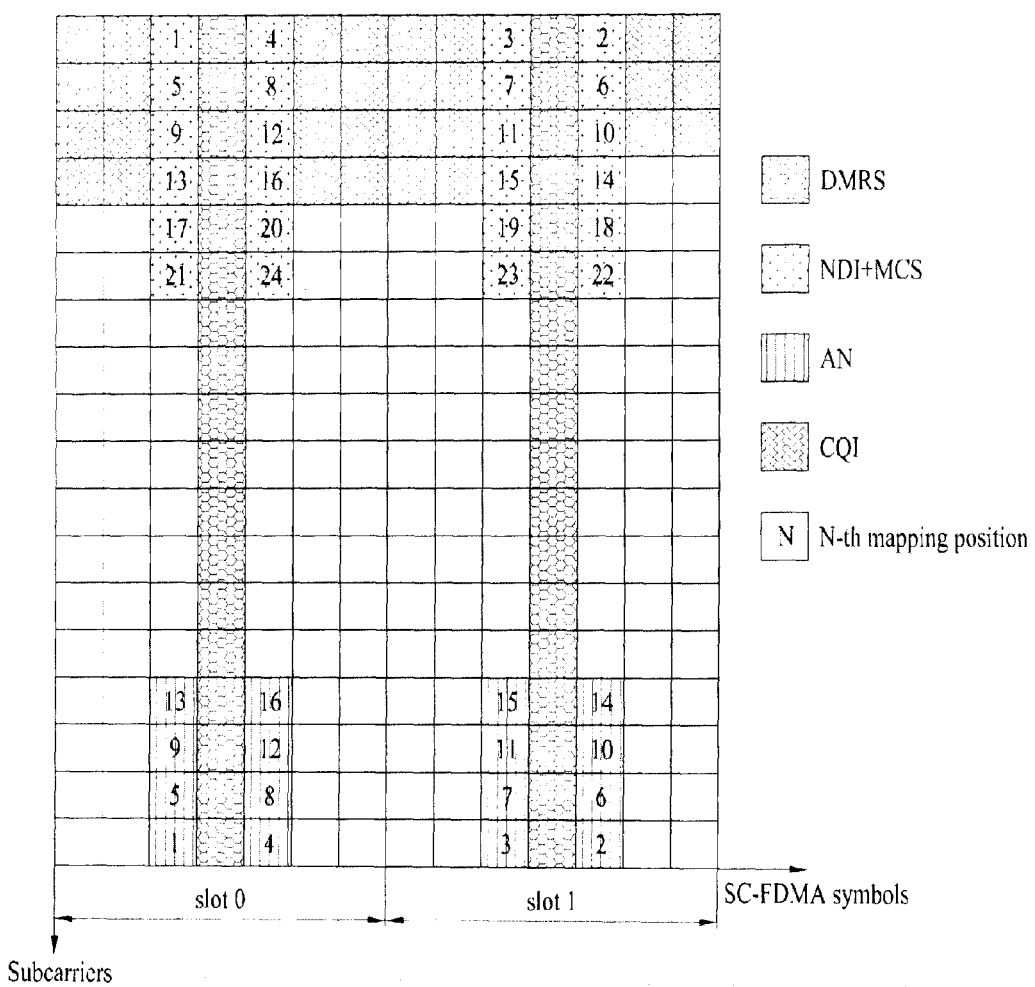
FIG. 13 illustrates an exemplary subframe structure for D2D communication according to another embodiment(s) of the present invention.

FIG. 13 illustrates mapping positions D2D control information according to another embodiment of the present invention. In FIG. 13, an MCS is mapped from the lowest subcarrier number, and a CQI is transmitted at a starting position of D2D data. In this case, the MCS is punctured into the CQI. To minimize such puncturing, a coding rate of punctured D2D control information may be reduced, or an offset may be applied to subcarriers when a puncturing position of D2D control information is configured such that mapping to some subcarriers for transmitting other D2D control information is prevented.

Figure 14:
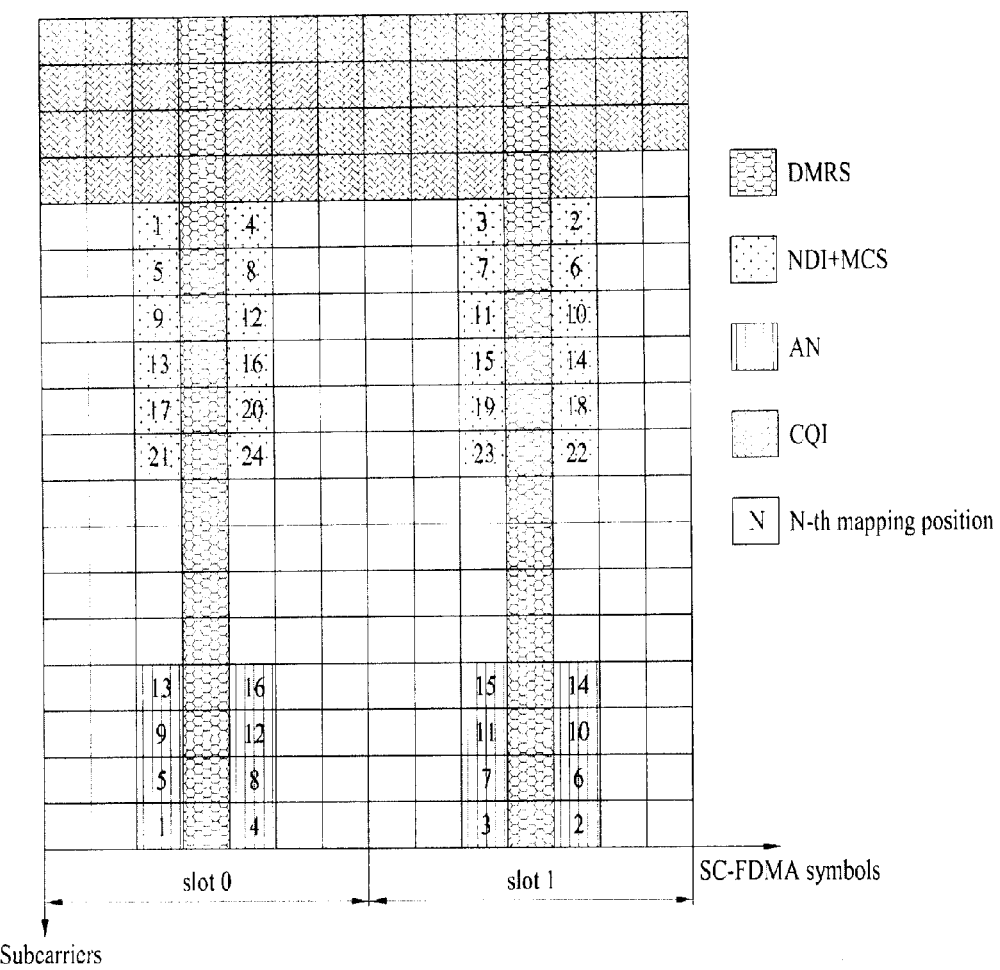
FIG. 14 illustrates an exemplary subframe structure for D2D communication according to another embodiment(s) of the present invention.

FIG. 14 illustrates a subframe structure in which an offset is applied to some subcarriers according to another embodiment of the present invention. Referring to FIG. 14, an offset is applied to first to third subcarriers, and a part of a fourth subcarrier such that D2D control information is not mapped thereto.

Figure 15:
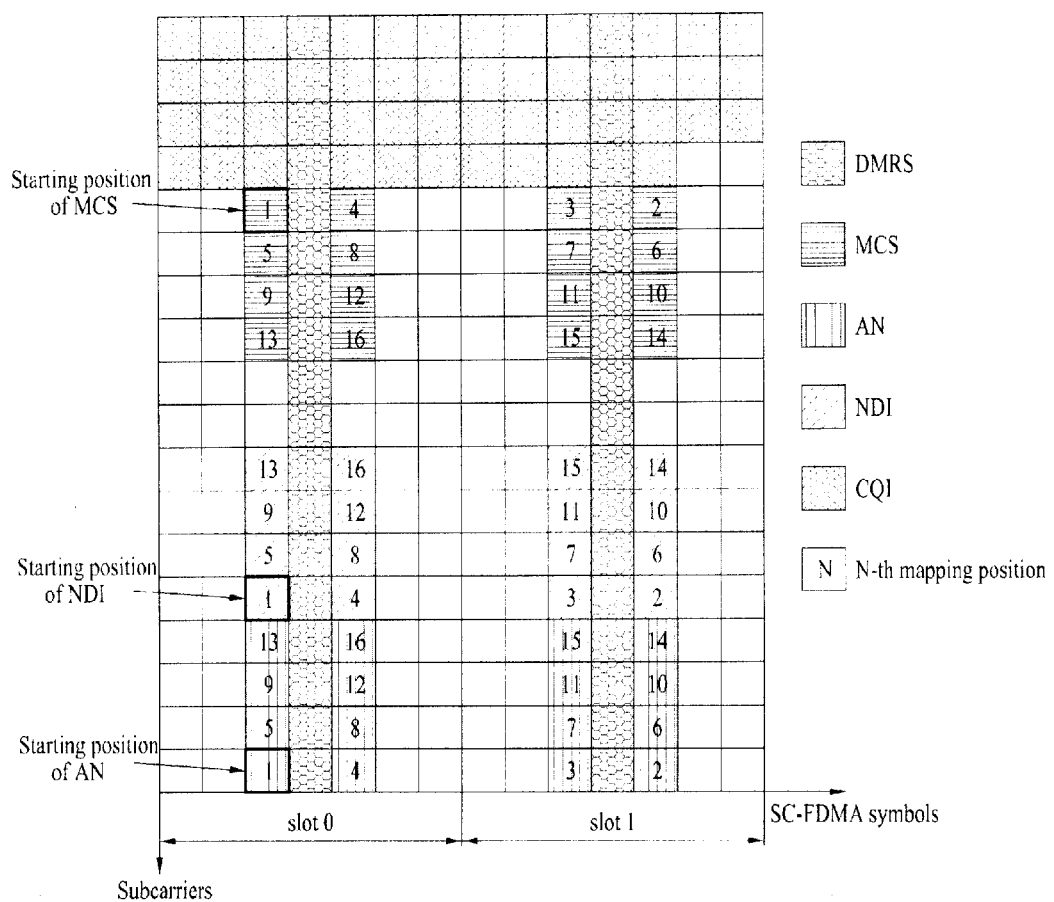
FIG. 15 illustrates an exemplary subframe structure for D2D communication according to another embodiment(s) of the present invention.

Meanwhile, the location of each type of D2D control information may be independently configured not to overlap with that of other D2D control information. In this case, the mapping position and order of each type of D2D control information may be independently determined. For example, as illustrated in FIG. 15, when an MCS, an NDI and an AN are mapped to 4 symbols adjacent to DMRS symbols, a starting position and a mapping order of each type of D2D control information may be independently configured. In detail, an MCS field is mapped from the lowest subcarrier number and the lowest symbol number within a region allocated to the MCS field, and NDI and AN fields are mapped from the highest subcarrier number and the lowest symbol number within regions allocated to the NDI field and the AN field in FIG. 15.

Furthermore, different multiplexing schemes may be applied to the D2D control information, i.e., the AN, the NDI, the CQI and the MCS, depending on which of rate matching and puncturing is a reasonable multiplexing scheme for each type of D2D control information. In FIG. 6, the AN is punctured into and transmitted using symbols adjacent to a DMRS while the MCS is transmitted through rate matching. Likewise, specific D2D control information may be multiplexed through puncturing and other specific D2D control information may be multiplexed through rate matching in a selective manner. For example, puncturing may be used for relatively high-priority control information such as the MCS, the NDI and the AN, and rate matching may be applied to relatively low-priority or large control information such as the CQI.

Meanwhile, in the case of the MCS, a reference MCS for detecting an MCS field (e.g., QPSK) may be pre-defined or pre-designated to prevent error propagation, MCS detection may be performed by assuming the reference MCS, and then the other D2D control information and D2D data may be received. Accordingly, it may be useful to puncture the MCS field into a position adjacent to a DMRS.

Figure 16:
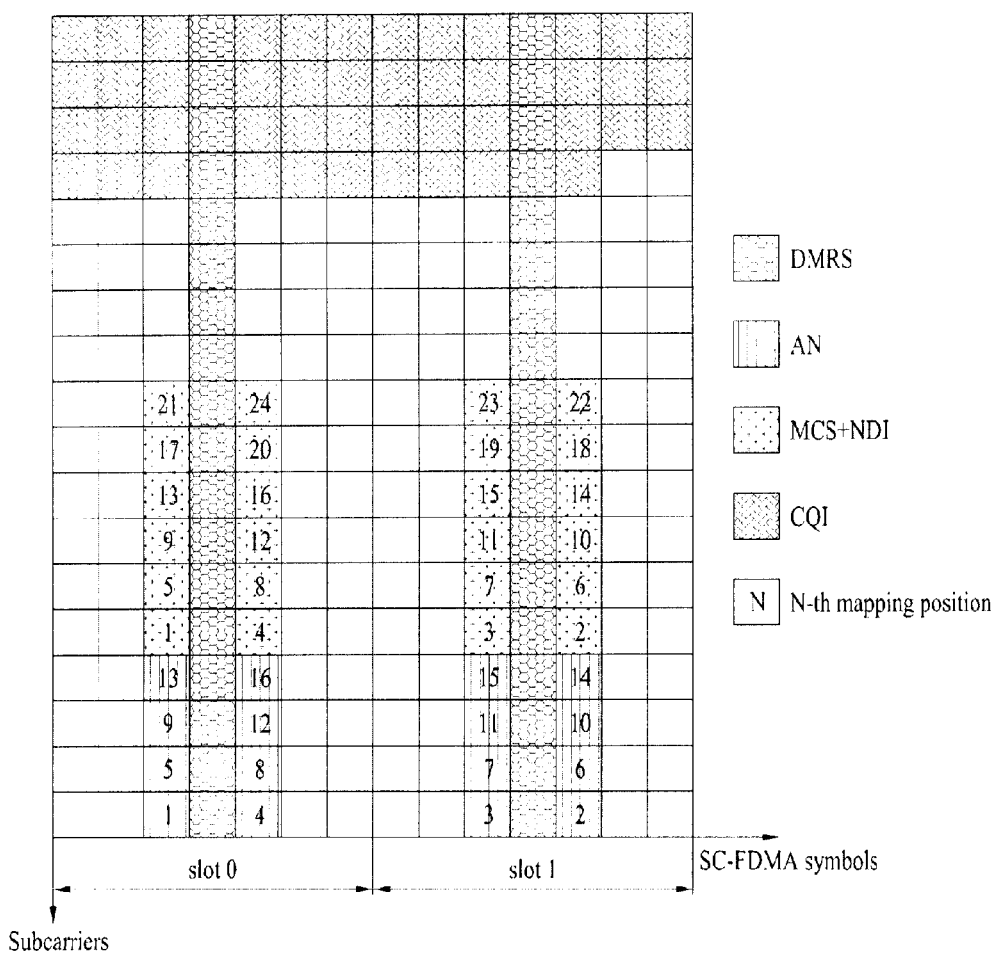
FIG. 16 illustrates an exemplary subframe structure for D2D communication according to another embodiment(s) of the present invention.

Furthermore, the above D2D control information transmission scheme has been exemplarily described using a normal CP but may be equally applied to an extended CP. FIG. 16 illustrates that the D2D control information mapping scheme proposed for a normal CP is applied to an extended CP. In FIG. 16, MSC+NDI information and AN (or HAQR-ACK) information are transmitted using 4 symbols adjacent to DMRS symbols, and CQI information is transmitted at a starting position of D2D data. The D2D data is rate-matched by the CQI.

Embodiment 7

Figure 17:
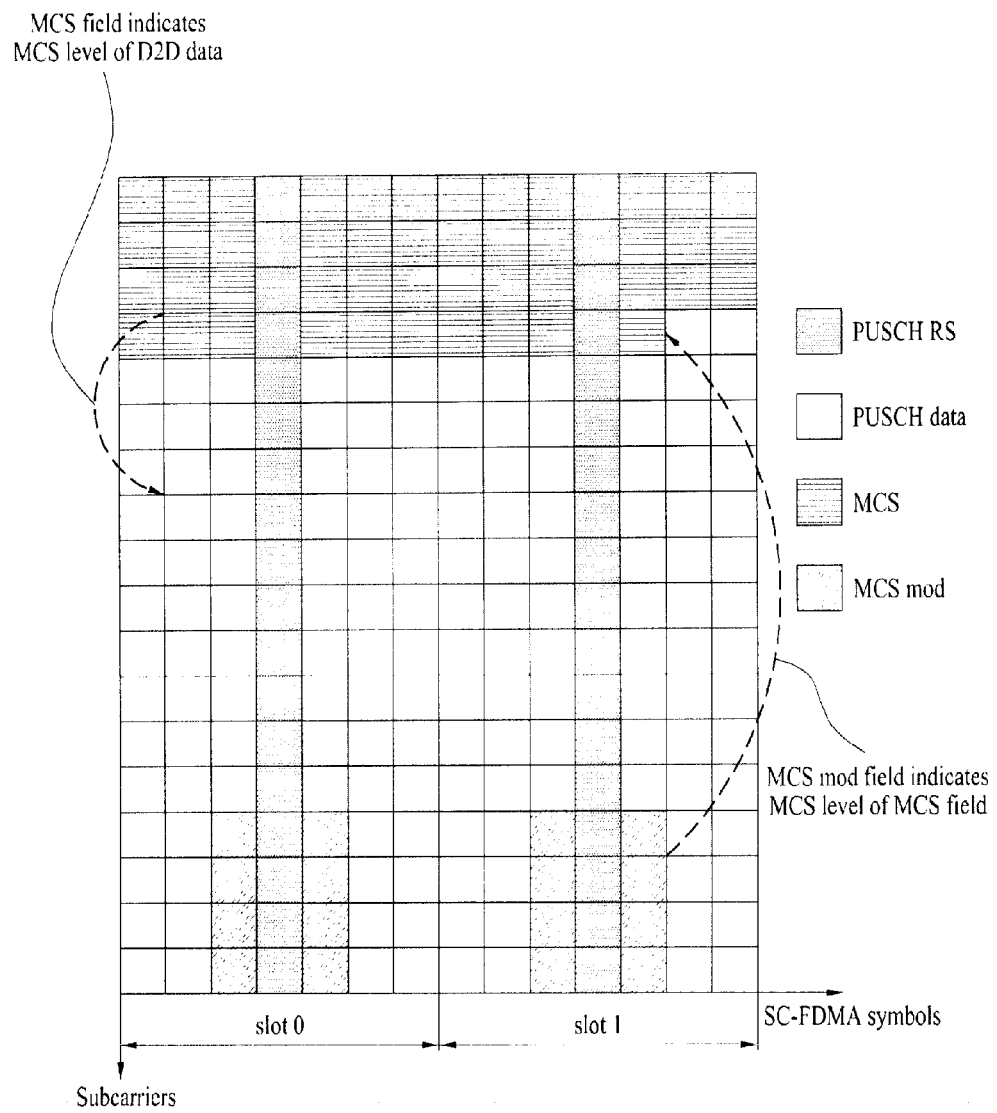
FIG. 17 illustrates an exemplary subframe structure for D2D communication according to another embodiment(s) of the present invention.

2-step approach may be used as another method for multiplexing a D2D control signal with a D2D data channel (i.e., a PUSCH) according to another embodiment of the present invention. The 2-step approach method may include step 1 for defining a control field to be transmitted at a specific position with a specific MCS and preferentially decoding this control field (in this case, the corresponding control field includes an MCS value of another control field), and step 2 for decoding another control field using an MCS value acquired from the corresponding control field. For example, as illustrated in FIG. 17, a transmitter UE may include a modulation scheme (and/or an aggregation level) of an MCS field in an MCS mod field. The modulation scheme/aggregation level of the MCS mod field uses a pre-defined or pre-designated method. A D2D UE may acquire an MCS of the MCS field by analyzing the MCS mod field, or acquire an MCS of D2D data by analyzing the MCS field. For example, as illustrated in FIG. 17, the MCS mod field may be transmitted using legacy HARQ ACK/NACK puncturing REs, and D2D control information such as the MCS and D2D feedback information such as a CSI may be sequentially transmitted in a legacy CSI RE region.

Embodiment 8

Figure 18:
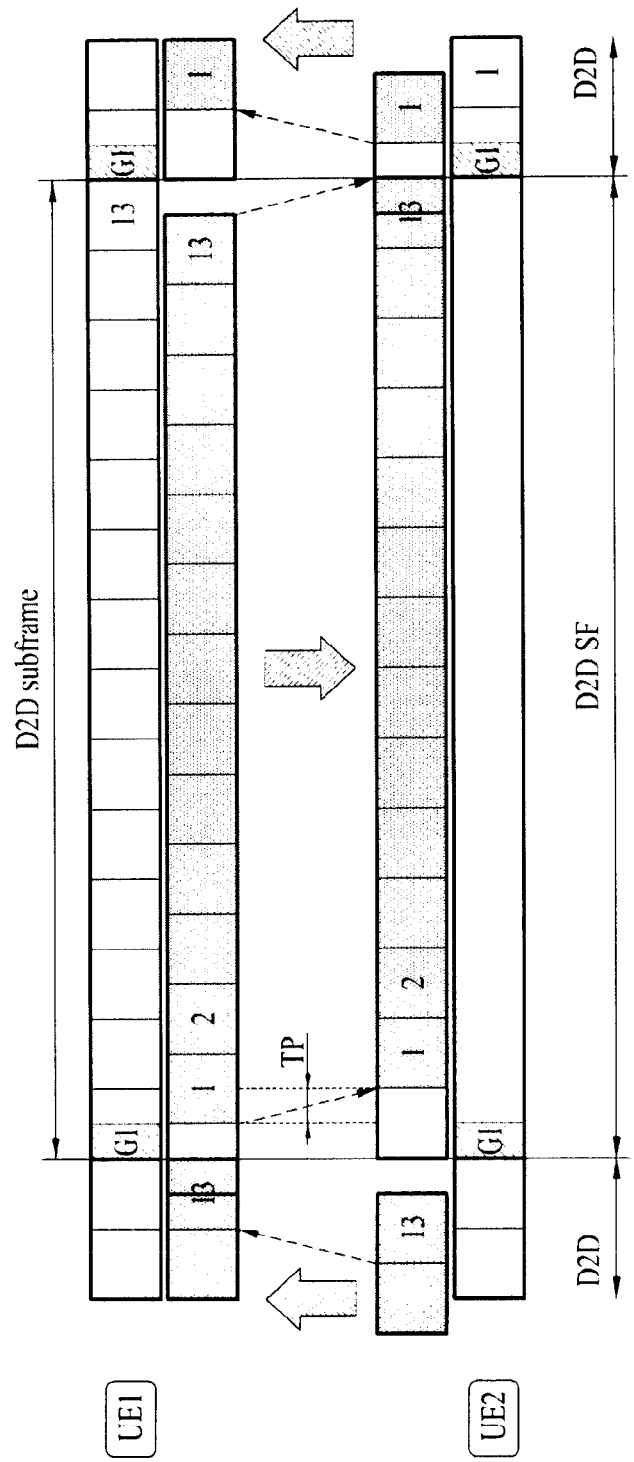
FIG. 18 illustrates exemplary switching between transmission (Tx) and reception (Rx) operations for D2D communication according to an embodiment(s) of the present invention.

In a D2D environment, a specific symbol period can be unusable due to Tx-Rx switching because a propagation delay and a Tx-Rx switching time between radio channels of UEs should be considered as illustrated in FIG. 18. That is, a D2D UE may transmit data and control information to a peer D2D UE in a specific SF, and then receive data and control information from the peer D2D UE in a subsequent SF. In this case, symbols corresponding to a time period required to switch a Tx mode to an Rx mode are not usable. Furthermore, the propagation delay also needs to be considered. The D2D UEs can have a timing difference corresponding to a time period caused by different UL TA values and a propagation delay (Tp) therebetween. Accordingly, 1 initial (or final) symbol can be punctured as illustrated in FIG. 18. In this case, 2 initial (or final) symbols can be punctured depending on the Tp value and the UL TA values.

Figure 19:
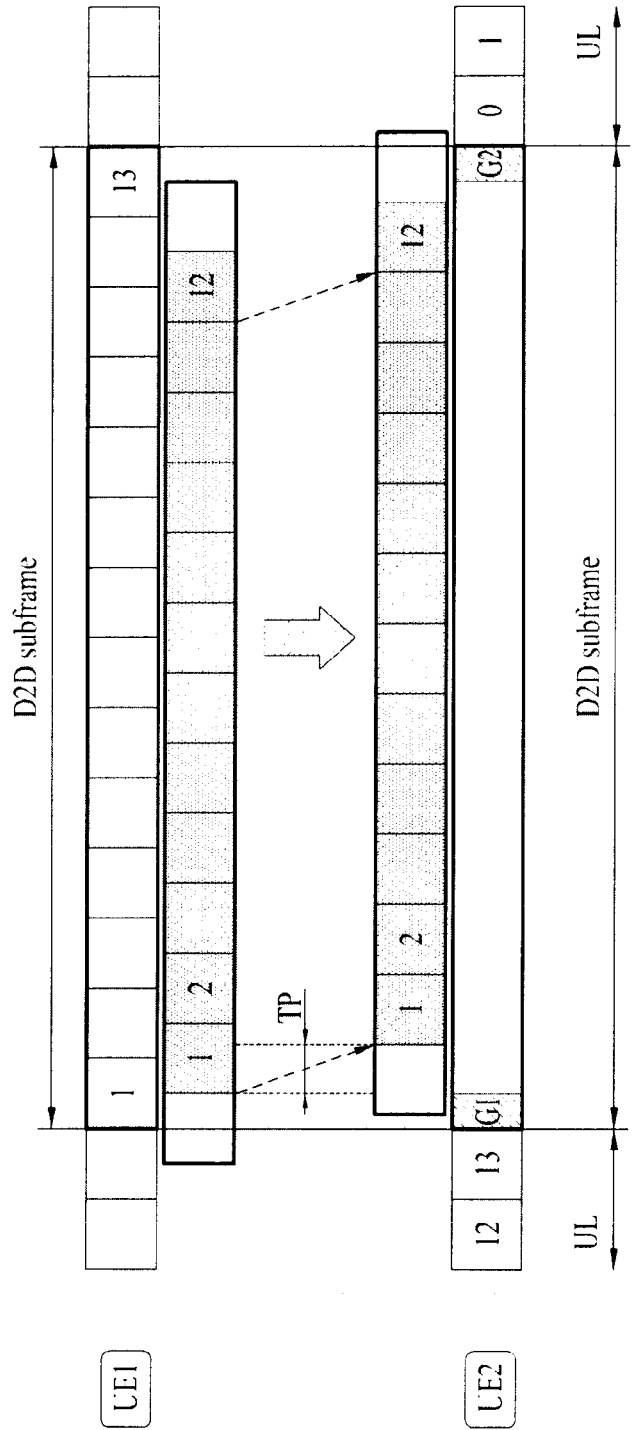
FIG. 19 illustrates exemplary switching between Tx and Rx operations for D2D communication according to another embodiment(s) of the present invention.

Meanwhile, 1 final (initial) symbol in addition to 1 initial (final) symbol should be punctured in consideration of switching from D2D Tx or Rx to macro UL as illustrated in FIG. 19.

Figure 8:
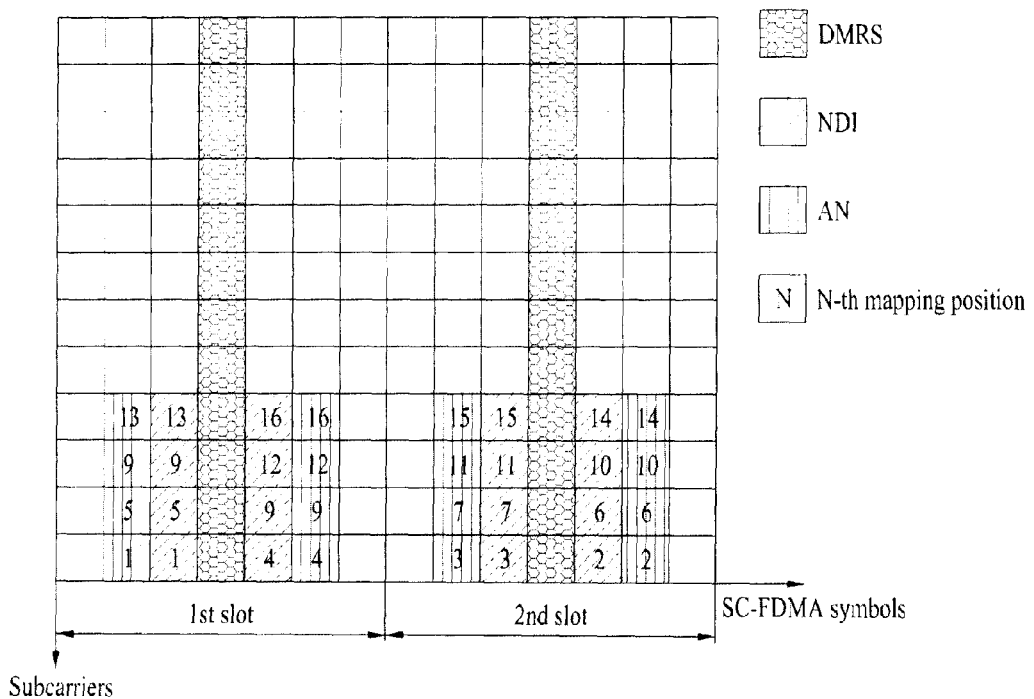
FIG. 8 illustrates an exemplary subframe structure for D2D communication according to another embodiment(s) of the present invention.

When a few initial (or final) symbols are punctured due to D2D Tx-Rx switching as described above, positions for transmitting D2D control information may be defined differently from other cases. For example, when the NDI is mapped to symbols 2, 4, 9 and 11 and the AN is mapped to symbols 1, 5, 8 and 12 as illustrated in FIG. 8, if 2 initial symbols are punctured, the AN transmitted using symbol 1 is influenced. Accordingly, when D2D control information is mapped to a punctured symbol, the corresponding information may be defined to be remapped to other symbols. This principle is equally applied to a case in which a few final symbols are punctured.

Figure 20:
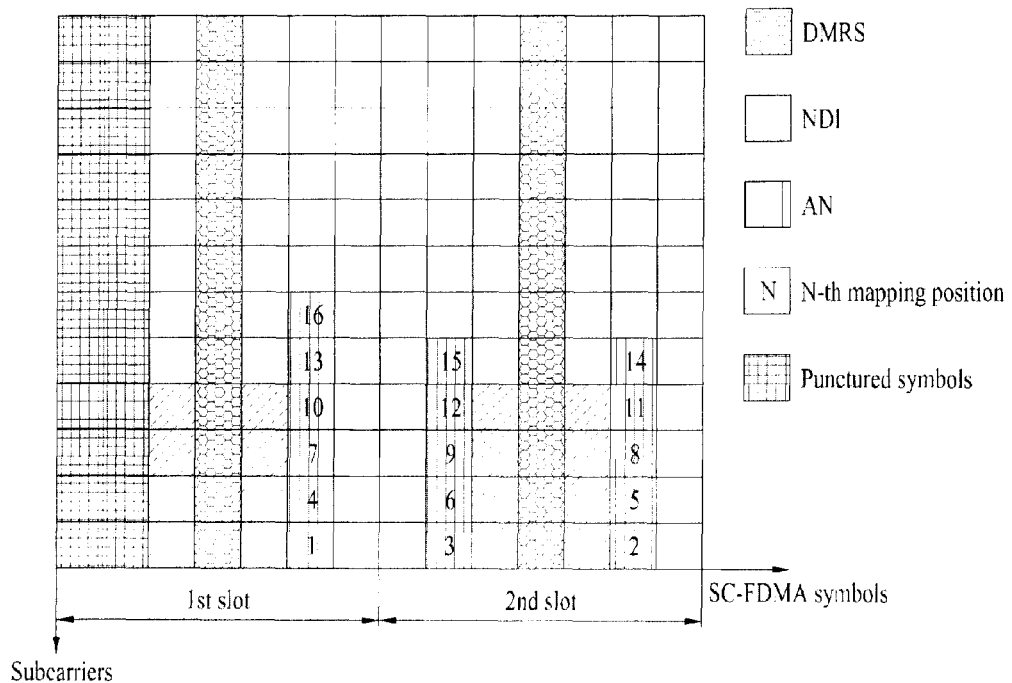
FIG. 20 illustrates an exemplary subframe structure for D2D communication according to another embodiment(s) of the present invention.

In this case, a new mapping rule can be made using a method for mapping coded symbols sequentially to remaining symbols other than punctured symbols. Using this method, in the case of FIG. 8, if symbol 1 is punctured, the AN mapped to symbols 1, 5, 8 and 12 will be remapped to symbols 5, 8 and 12. An example thereof is illustrated in FIG. 20.

Figure 21:
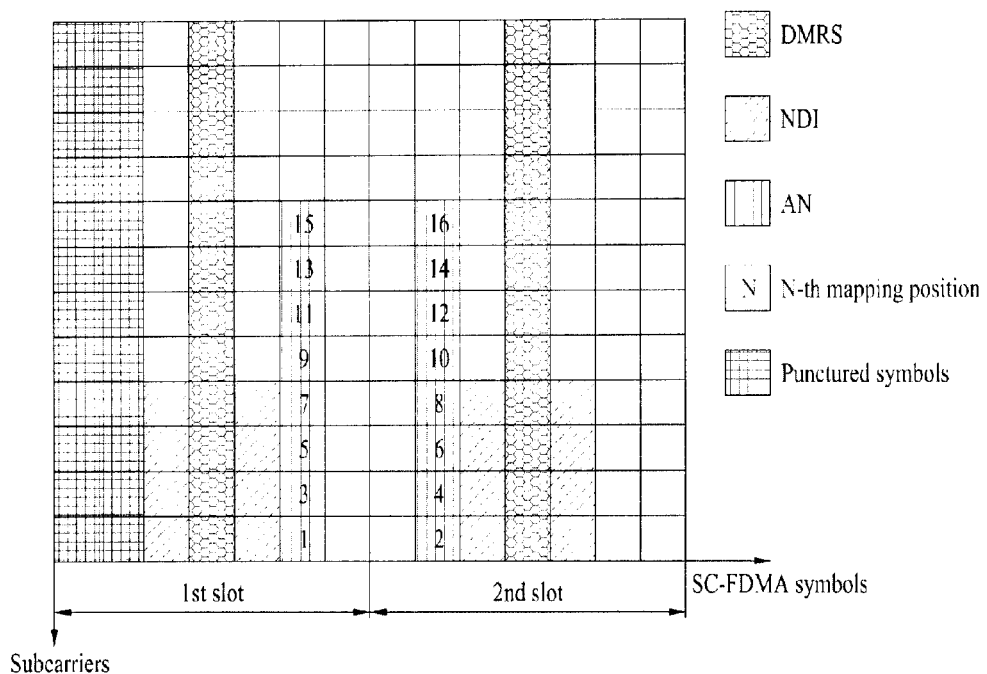
FIG. 21 illustrates an exemplary subframe structure for D2D communication according to another embodiment(s) of the present invention.

Alternatively, not all but only a few specific ones among remaining usable symbols may be used. Using this method, if symbol 1 is punctured, the AN mapped to symbols 1, 5, 8 and 12 may be remapped to symbols 5 and 8 as illustrated in FIG. 21.

In particular, when an extended CP is used or two or more types of D2D control information are mapped to a specific symbol, if 1 or 2 initial and/or final symbols are punctured, a new mapping method should be defined for a plurality of D2D control signals. In this case, since the number of usable symbols is reduced and thus all D2D control signals cannot be easily mapped to the remaining symbols, specific D2D control information may be multiplexed through rate matching instead of puncturing.

Figure 22:
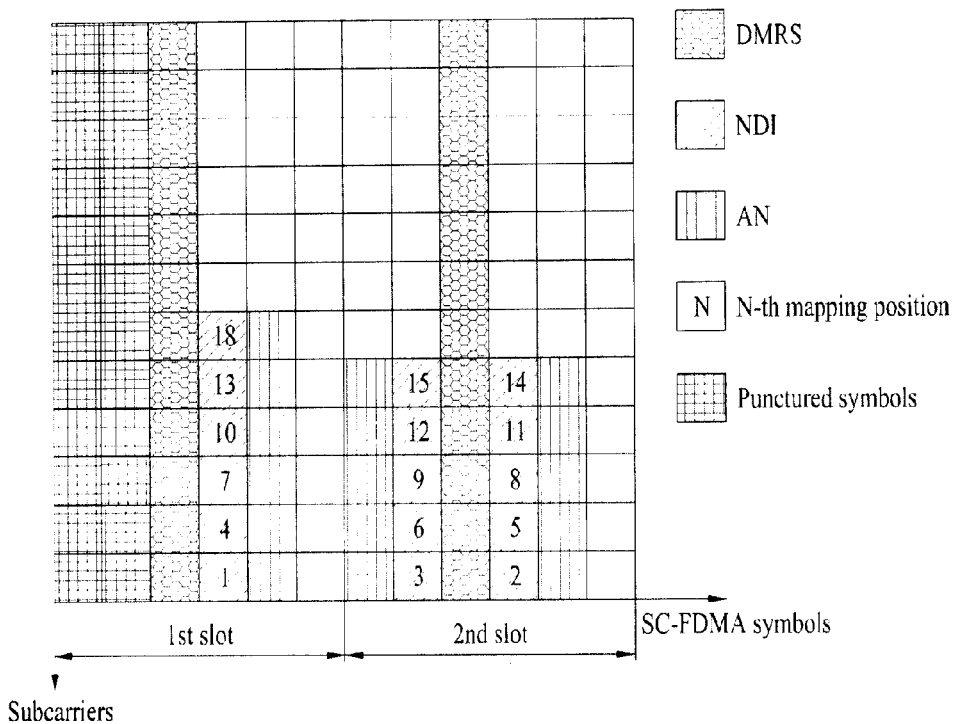
FIG. 22 illustrates an exemplary subframe structure for D2D communication according to another embodiment(s) of the present invention.

FIG. 22 illustrates that both of two types of D2D control information (i.e., an NDI and an AN) can be influenced if 2 initial symbols are punctured in an extended CP. In this case, positions for transmitting each type of D2D control information may be reallocated to evenly use remaining usable symbols in the same manner as that in a normal CP. Alternatively, a few specific symbols or other arbitrary symbols may be used as illustrated in FIG. 21, or the positions may be reconfigured to be mapped from a starting position of data, like a CQI. Furthermore, different reconfiguration methods may be applied to different types of D2D control information.

Embodiment 9

Differently from FIGS. 18 and 19, only Tx or Rx may be performed in two or more contiguous SFs. When Tx or Rx is continuously performed in contiguous SFs as described above, all symbols may be used without puncturing a few initial or final symbols. Accordingly, symbols usable in 3 distinctive cases and mapping positions of D2D control information based on the usable symbols may be configured.

For example, the following three different configurations may be assumed.

Conf. 1: 1 initial symbol is punctured.
Conf. 2: 1 initial symbol and 1 final symbol are punctured.
Conf. 3: No symbol is punctured.

Figure 23:
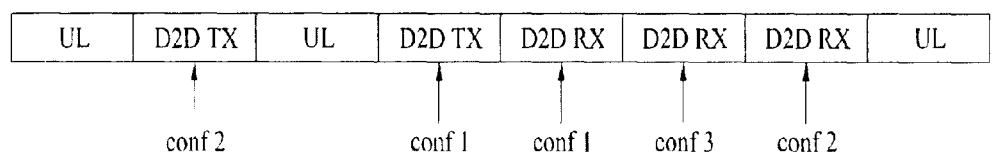
FIG. 23 illustrates exemplary switching between D2D Tx/Rx and normal UL transmission according to an embodiment(s) of the present invention.

FIG. 23 illustrates a configuration applied to each SF based on D2D SFs configured according to an embodiment of the present invention.

Figure 24:
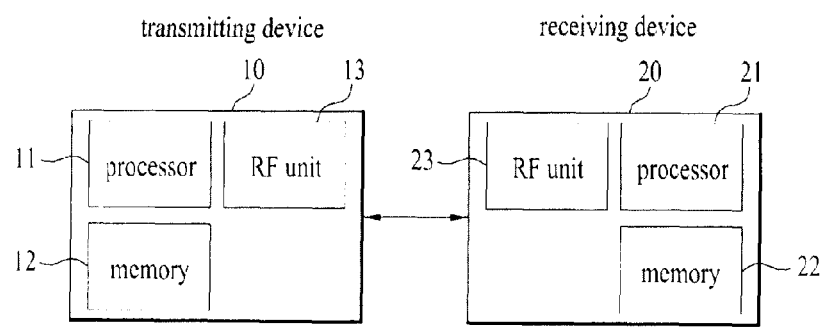
FIG. 24 is a block diagram of apparatuses for implementing embodiment(s) of the present invention.

FIG. 24 is a block diagram showing components of a transmitting device 10 and a receiving device 20 for performing the embodiments of the present invention. The transmitting device 10 and the receiving device 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signals. The memories 12 and 22 may be used as a buffer. The processors 11 and 21 generally control the overall operation of the various modules of the transmitting device and the receiving device. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitting device 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiving device in the form of one or more layers. For frequency up-conversion, the RF unit 13 may include an oscillator. The RF unit 13 may include Nt (Nt being a positive integer) transmit antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE and a peer UE of the UE operates as the transmitting device 10 and operates as the receiving device 20 in a band for the D2D communication. In the embodiments of the present invention, it is assumed that the D2D communication is implemented in an uplink, the UE and the peer UE operates as the receiving device 20 and operates as the transmitting device 10 in uplink.

The transmitting device 10 and/or the receiving device 20 may perform a combination of at least one or two embodiments among the above-described embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a relay and a base station (BS).

The invention claimed is:

1. A method for transmitting a control signal for Device to Device (D2D) communication between a first terminal and a second terminal in a wireless communication system, the method performed by the first terminal and comprising:
    determining a priority of each type of D2D control information;
    mapping the D2D control information to a D2D resource region based on the priority of each of the D2D control information types; and
    transmitting the D2D control information together with D2D data to the second terminal,
    wherein if a priority of a first D2D control information is higher than a priority of a second D2D control information, the first D2D control information is mapped to one or more first symbols and the second D2D control information is mapped to one or more second symbols, wherein a location of the one or more first symbols is closer to one or more symbols where a reference signal is mapped than a location of the one or more second symbols.

2. The method according to claim 1, wherein the first D2D control information is multiplexed through puncturing, and the the second D2D control information is multiplexed through rate matching.

3. The method according to claim 1, wherein the first D2D control information and the second D2D control information are respectively modulated and coded using a predetermined modulation and coding scheme.

4. The method according to claim 1, further comprising:
    multiplexing the first D2D control information and the second D2D control information together; and
    mapping the first D2D control information and the second D2D control information to the same one or more symbols.

5. The method according to claim 1, wherein the first D2D control information is a Modulation and Coding Scheme (MCS) or a New Data Indicator (NDI), and the second D2D control information is a HARQ Acknowledgement/Negative Acknowledgement (ACK/NACK).

6. The method according to claim 1, wherein each of the first D2D control information and the second D2D control information is located adjacent to the one or more symbols where the reference signal is mapped.

7. A terminal that transmits a control signal for Device to Device (D2D) communication in a wireless communication system, the terminal comprising:
    a Radio Frequency (RF) unit; and
    a processor that controls the RF unit,
    wherein the processor:
    determines a priority of each type of D2D control information;
    maps D2D control information to a D2D resource region based on the priority of each of the D2D control information types; and
    controls the RF unit to transmit the D2D control information together with D2D data to a peer terminal,
    wherein if a priority of a first D2D control information is higher than a priority of a second D2D control information, the first D2D control information is mapped to one or more first symbols and the second D2D control information is mapped to one or more second symbols, where a location of the one or more first symbols is closer to one or more symbols where a reference signal is mapped than a location of the one or more second symbols.

8. The terminal according to claim 7, wherein the first D2D control information is multiplexed through puncturing, and the second D2D control information is multiplexed through rate matching.

9. The terminal according to claim 7, wherein the first D2D control information and the second D2D control information are respectively modulated and coded using a predetermined modulation and coding scheme.

10. The terminal according to claim 7, wherein the processor is further:
   multiplexes the first D2D control information and the second D2D control information together, and
   maps the first D2D control information and the second D2D control information to the same one or more symbols.

11. The terminal according to claim 7, wherein the first D2D control information is a Modulation and Coding Scheme (MCS) or a New Data Indicator (NDI), and the second D2D control information is a HARQ Acknowledgement/Negative Acknowledgement (ACK/NACK).

12. The terminal according to claim 7, wherein each of the first D2D control information and the second D2D control information is located adjacent to the one or more symbols where the reference signal is mapped.

\* \* \* \* \*